United States Patent Office 3,127,447
Patented Mar. 31, 1964

---

3,127,447
METHYLNAPHTHALENE DERIVATIVES
John J. Jaruzelski, Pittsburgh, and Myron H. Wilt, Monroeville Borough, Pa., assignors to United States Steel Corporation, a corporation of New Jersey
No Drawing. Filed Apr. 8, 1960, Ser. No. 20,816
1 Claim. (Cl. 260—570.9)

This invention relates to amines of chloromethylmethylnaphthalene and the production thereof.

We have discovered that useful compounds may be produced by the treatment of chloromethylmethylnaphthalene with nitrogen-containing reagents. The resulting products are useful as pickling inhibitors, bactericides or anti-oxidants and the manner of using them for such purposes will be explained in detail later. The reagent may be one of a number of amines or other compounds containing nitrogen. Amines used for the preparation of the novel compounds comprise primary, secondary and tertiary amines. Other reagents are such heterocyclic bases as pyridine or morpholine. The general formula of the compounds and the method of their preparation are illustrated by the following equation:

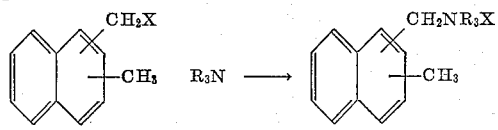

In the structural formulas above, X is a halide, R represents an alkyl or aryl group, hydrogen or some of both. The R's may be identical or different alkyl or aryl groups.

The starting material used in carrying out our method is a chloromethylmethylnaphthalene such as 1-chloromethyl-2-methylnaphthalene, or 4-chloromethyl-1-methylnaphthalene. The invention will be explained in detail in connection with the typical examples outlined below. The starting material in each case is 1-chloromethyl-2-methylnaphthalene. This product may be easily made from 2-methylnaphthalene by the following procedure:

A solution of 639 grams of 2-methylnaphthalene in 700 grams of ligroin (boiling point 100 to 110° C.) was added to a 5000-ml. flask containing 650 grams of concentrated hydrochloric acid. This mixture was treated with 225 grams of paraformaldehyde; then it was heated and agitated for 8 hours while a steady stream of hydrogen chloride was being passed through it. The reaction mixture was permitted to cool and the organic layer was separated, washed with water and distilled. The product, 1-chloromethyl-2-methylnaphthalene, was collected at 133 to 142° C. under an absolute pressure of 3.0 mm. mercury and amounted to 520 grams. The solidified product melted at from 62 to 64° C. The reaction occurring was:

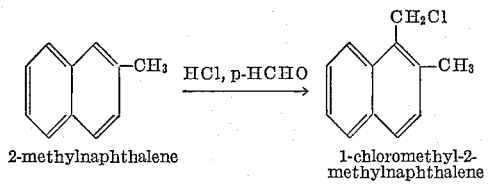

The following examples show the conversion of the above starting material to various products, depending on the reagent used in each case.

*Example I.—1-(N,N-Diethylaminomethyl)-2-Methylnaphthalene*

A solution of 24.0 grams of diethylamine in methanol was treated with 50.0 grams of 1-chloromethyl-2-methylnaphthalene and refluxed for 5.5 hours. After removal of methanol by distillation, the residue was made basic with aqueous sodium hydroxide. An oil separated and was distilled to yield 52.6 grams of 1-(N,N-diethylaminomethyl)2-methylnaphthalene. The product distilled at 118 to 124° C. under an absolute pressure of 1.1 mm. mercury and had a refractive index of 1.5775 at 26° C. Its nitrogen content was 5.93%, compared to 6.18%, calculated for $C_{16}H_{21}N$. The reaction was:

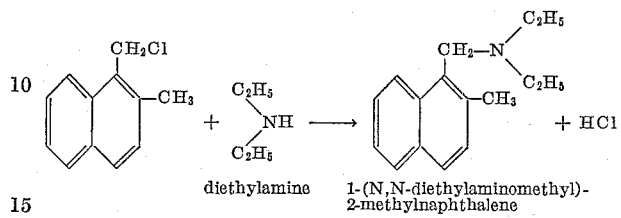

*Example II.—N-[(2-Methylnaphthyl)Methyl]Pyridinum Chloride*

A hot solution of 40.0 grams of 1-chloromethyl-2-methylnaphthalene in 150 ml. of benzene was treated with 17.0 grams of pyridine in 50 ml. of benzene and refluxed for 10 hours. After cooling, the reaction mixture was filtered, giving 43.3 grams of the desired N-[(2-methylnaphthyl)methyl]pyridinium chloride. Concentration of the filtrate produced an additional 4.6 grams of the product, increasing the total yield to 85%. The purified N - [(2 - methylnaphthyl)methyl]pyridinium chloride melts at 228 to 233° C. and is fairly hygroscopic. Its composition was N, 4.94%; Cl, 13.73%, compared to N, 5.20%; Cl, 13.2%, calculated for $C_{17}H_{16}NCl$. The reaction was:

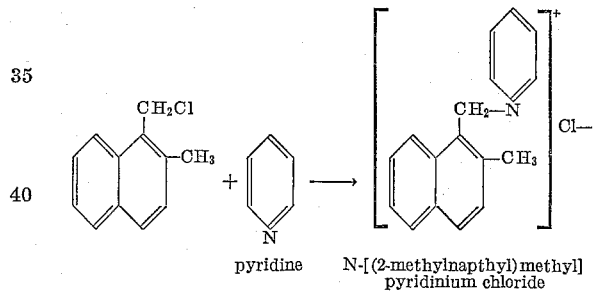

*Example III.—3-(2-Methylnaphthyl)Methyl-3-Azapentanediol-1,5*

A solution of diethanolamine (34.0 grams) was treated with 1-chloromethyl-2-methylnaphthalene (60.0 grams) and refluxed for 4 hours. The reaction mixture was treated with sodium hydroxide pellets, filtered, and distilled under vacuum. The distillation gave 31.8 grams of the desired 3-(2-methylnaphthyl)methyl-3-azapentanediol 1,5. The product distilled at 206 to 212° C. under 2.0 mm. mercury absolute pressure and had a melting range from 86 to 90° C. Its composition was C, 74.1%; H, 8.1%; N, 5.5%; compared to C, 74.2%; H, 8.1%; N, 5.4% calculated for $C_{16}H_{21}NO_2$. The reaction was:

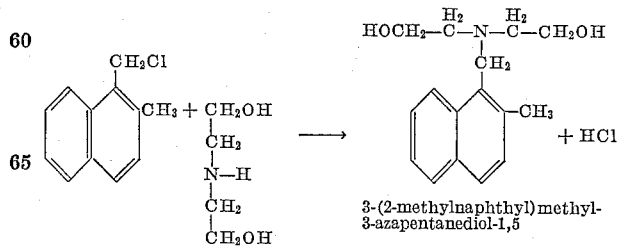

*Example IV.—N-(2-Methylnaphthyl)Methylmorpholine*

To a solution of 18.7 grams of morpholine (also called diethylene imide oxide) in 125 ml. of benzene, 40 grams of 1-chloromethyl-2-methylnaphthalene was added. The mixture was refluxed for 3.5 hours, treated with 18 grams of 50% sodium hydroxide, and stirred for an additional 1.5 hours. After filtration, the filtrate was concentrated under vacuum until it became semisolid. The semisolid material was extracted with hot petroleum ether. The ether was cooled, and precipitation gave 27.1 grams of the desired N-(2-methylnaphthyl)methylmorpholine melting at 55 to 57° C. A by-product of this reaction was N-(2-methylnaphthyl)methylmorpholine hydrochloride, which melted at 212 to 216° C. The nitrogen content was 5.7%, compared to 5.8%, calculated for $C_{16}H_{19}NO$. The reaction was:

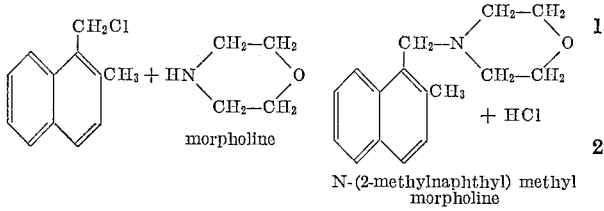

*Example V.—1-(2-Aminoethyl)2-Methylnaphthalene*

Treatment of 1-chloromethyl-2-methylnaphthalene with potassium cyanide in the usual manner gave the desired (2-methylnaphthyl)methyl cyanide in a 65% yield.

A slurry of 30.0 grams of 1-cyanomethyl-2-methylnaphthalene in 230 ml. of a solution of 8 weight percent ammonia in methanol was reduced with hydrogen and Raney nickel catalyst in a Parr hydrogenator. The required amount of hydrogen was absorbed in 2.5 hours at 50 to 60° C., and the reaction mixture was filtered and distilled. Distillation yielded 22.3 grams of the desired 1-(2-aminoethyl)-2-methylnaphthalene, which distilled at 130 to 140° C. at an absolute pressure of 1.4 mm. mercury and had a refractive index of 1.6183 at 27° C. The nitrogen content was 7.38% compared to 7.57%, calculated for $C_{13}H_{15}N$. The reactions were:

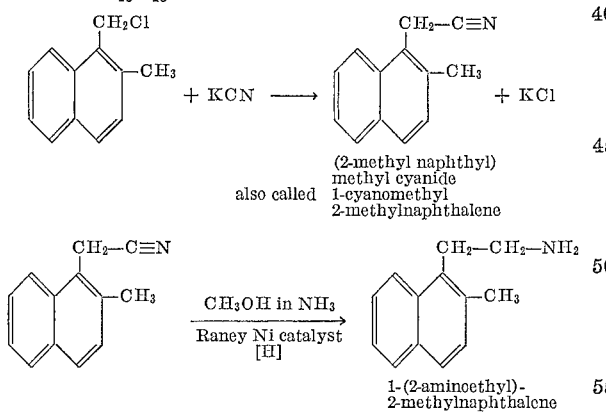

*Example VI.—Ethyl-Bis-[(2-Methylnaphthyl)Methyl] Amine and 1-Ethylaminomethyl-2-Methylnaphthalene*

63 grams of 70% aqueous ethylamine was added to 200 ml. of methanol. This solution was treated with a warm solution of 60 grams of 1-chloromethyl-2-methylnaphthalene in 100 ml. of methanol and refluxed for 2 hours. After the excess of ethylamine and methanol was removed by distillation, the residue was treated with strong sodium hydroxide and filtered. A solid, which was separated by filtration, after recrystallization from methanol, amounted to 10.7 grams and melted at 133 to 135° C. This material was identified as ethyl-bis-[(2-methylnaphthyl)methyl]amine. The nitrogen content was 3.80%, 3.94%; compared to 3.97%, calculated for $C_{26}H_{27}N$.

Distillation of the filtrate gave 36.4 grams of 1-ethylaminoethyl-2-methylnaphthalene, which distilled at 126 to 132° C. at 2.0 mm. mercury absolute pressure and had a refractive index of 1.5940 at 26° C. The nitrogen content was 7.31%, 7.45%, compared to 7.05%, calculated for $C_{14}H_{17}N$. The reactions were:

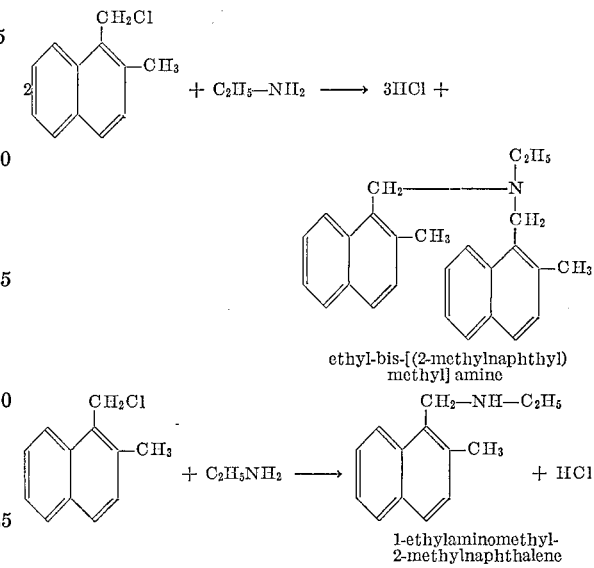

*Example VII.—Trimethyl-(2-Methylnaphthyl)Methylammonium Chloride*

44 grams of a 25% solution of trimethylamine, 35.7 grams of 1-chloromethyl-2-methylnaphthalene, and 150 grams of methanol were heated to reflux for 12 hours. Methanol was removed by distillation. The semi-solid residue, dried under vacuum, was 45.8 grams of the desired trimethyl-(2-methylnaphthyl)methylammonium chloride, which melted with decomposition at 174 to 182° C. Its composition was N, 5.63%, 5.37%; Cl, 13.56%, 13.31%, compared to N, 5.62%; Cl, 14.20%, calculated for $C_{15}H_{20}NCl$. The reaction was:

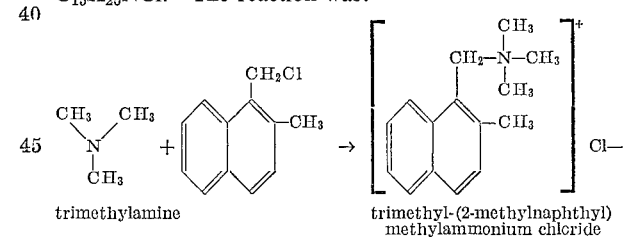

*Example VIII.—1-Phenylaminomethyl-2-Methylnaphthalene*

Aniline (46.5 grams) was dissolved in 100 ml. of methanol and treated with a hot solution of 57.0 grams of 1-chloromethyl-2-methylnaphthalene in 60 ml. of methanol. The mixture was refluxed with stirring for 4.5 hours, treated with aqueous sodium hydroxide, and, after dilution with water, the organic layer was separated.

The unreacted aniline was removed by steam distillation and, after recrystallization from ethyl alcohol, 39.6 grams of 1-phenylaminomethyl - 2 - methylnaphthalene, melting at 98 to 101° C., were obtained. The nitrogen content was 5.48%, 5.70%, compared to 5.66%, calculated for $C_{18}H_{17}N$. The reaction was:

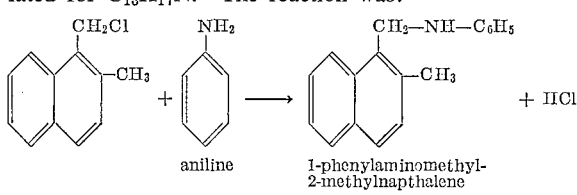

The utility of the compounds produced in Examples I, III, IV, V and VIII, as pickle inhibitors is shown by the following tests:

50. ml. of 10% hydrochloric acid were treated with 0.05 gram of the compound being tested. A one-inch square of 22 gage cold-rolled carbon steel sheet was suspended in the pickling solution. The solution was warmed to 70° C. and maintained at this temperature for 1.5 hours. The tested pieces were removed from the solution, washed with 95% ethanol, and dried. A one-inch square of the steel suspended in an uninhibited solution of 10% hydrochloric acid served as a control. The experimental results were as follows:

| Example | Inhibitor | Percent of Weight Lost |
|---|---|---|
|  | None | 24.5 |
| I | 1-(N,N-diethylaminomethyl)-2-methylnaphthalene. | 2.8 |
| V | 1-(2-aminoethyl)-2-methylnaphthalene | 3.4 |
| VIII | 1-(N-phenylaminomethyl)-2-methylnaphthalene | 0.6 |

50 ml. of 10% hydrochloric acid were treated with 0.05 gram of the compound being evaluated. A one-inch square of 20-gage carbon steel was suspended in the pickling solution. The solution was warmed to 80° C., and maintained at this temperature for 2 hours. The tested pieces were removed from the solution, wiped and weighed to determine any loss of weight. A one-inch square of 20-gage carbon steel suspended in an uninhibited solution of 10% hydrochloric acid was considered as a control. The experimental results are given below:

| Example | Inhibitor | Percent of Weight Lost |
|---|---|---|
|  | None | [1] 100.0 |
| III | 3-(2-methylnaphthyl)methyl-3-azapentanediol-1,5. | 1.4 |
| IV | N-(2-methylnaphthyl)methylmorpholine | 0.9 |

[1] Completely dissolved.

It is thus apparent that a dilute solution of HCl (10%) such as is commonly employed as pickle liquor, may be inhibited by the addition of as little as 0.1% of our novel compounds.

The compounds of Examples II and VII are useful as bactericidal agents. When the dry powdered material is sprinkled on a culture of *Escherichia coli* or *Micrococcus pyogenes aureus*, for example, a pronounced inhibiting effect thereon is observed.

The compound of Example VI has anti-oxidant qualities as shown by the following test:

A 0.04 gram quantity of the compound of Example VI was dissolved in 4.00 grams of boiled linseed oil, and the solution was placed in a petri dish 90 mm. in diameter. The change in weight of the oil after standing at room temperature for 25 hours (a measure of oxygen absorption) was determined. A sample of untreated oil similarly exposed served as a control. Test results were as follows:

| Antioxidant: | Gain in weight mg./4.00 grams of oil |
|---|---|
| None | 151 |
| 1-(ethylaminomethyl)-2-methylnaphthalene | 43 |

Thus a 1% addition of the new compound to linseed oil materially reduces the oxidation thereof.

It is evident from the foregoing that our invention provides a group of amine derivatives of chloromethyl-methylnaphthalene having useful properties, which can be readily made by simple and direct procedures.

Although we have disclosed herein the preferred practice of our invention, we intend to cover as well any change or modification therein which may be made without departing from the spirit and scope of the invention.

We claim:

1-phenylaminomethyl-2-methylnaphthalene.

References Cited in the file of this patent

UNITED STATES PATENTS

| 2,276,587 | Mettler et al. | Mar. 17, 1942 |
| 2,459,338 | Rawlins et al. | Jan. 18, 1949 |
| 2,608,584 | Sprules et al. | Aug. 26, 1952 |
| 2,676,987 | Lewis et al. | Apr. 27, 1954 |
| 2,778,826 | Schmidle | Jan. 22, 1957 |
| 2,780,604 | Clarke et al. | Feb. 5, 1957 |
| 2,884,456 | Campbell | Apr. 28, 1959 |
| 2,909,525 | Fand | Oct. 20, 1959 |
| 2,931,833 | Matt | Apr. 5, 1960 |
| 2,993,894 | Marcus et al. | July 25, 1961 |

OTHER REFERENCES

Mayer et al.: Deutsche Chemische Gessellschaft (Berichte), vol. 56: page 1413 (1923).

Braun et al.: Deutsche Chemische Gessellschaft (Berichte), vol. 56: page 2170 (1923).

Coles et al.: J. Amer. Chem. Soc., vol. 60: pages 853–854 (1938).

Leffler et al.: J. Amer. Chem. Soc., vol. 60: page 899 (1938).

Chem. Abstr—Decennial Subject Index, volumes 31–40 (1937–1946): page 3958.

Lutz et al.: J. Org. Chem., vol. 12: page 762 (1947).

UNITED STATES PATENT OFFICE
CERTIFICATE OF CORRECTION

Patent No. 3,127,447             March 31, 1964

John J. Jaruzelski et al.

It is hereby certified that error appears in the above numbered patent requiring correction and that the said Letters Patent should read as corrected below.

Column 1, lines 24 to 29, the structual formula should appear as shown below instead of as in the patent:

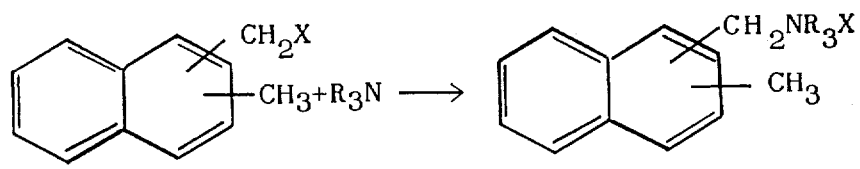

column 4, lines 4 to 10, the structual formula should appear as shown below instead of as in the patent:

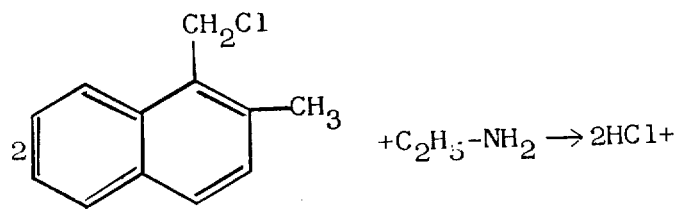

Signed and sealed this 4th day of August 1964.

(SEAL)
Attest:

ERNEST W. SWIDER             EDWARD J. BRENNER

Attesting Officer             Commissioner of Patents